US010217083B2

(12) United States Patent
Takahashi et al.

(10) Patent No.: US 10,217,083 B2
(45) Date of Patent: Feb. 26, 2019

(54) APPARATUS, METHOD, AND PROGRAM FOR MANAGING ARTICLES

(71) Applicant: Kabushiki Kaisha Toshiba, Minato-ku, Tokyo (JP)

(72) Inventors: Shihomi Takahashi, Kanagawa (JP); Kaoru Suzuki, Kanagawa (JP); Kazunori Imoto, Kanagawa (JP); Osamu Yamaguchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 51 days.

(21) Appl. No.: 15/260,998

(22) Filed: Sep. 9, 2016

(65) Prior Publication Data

US 2017/0124424 A1    May 4, 2017

(30) Foreign Application Priority Data

Nov. 2, 2015   (JP) .................................. 2015-215971

(51) Int. Cl.
   *G06K 9/00*    (2006.01)
   *G06K 9/32*    (2006.01)
   *G06Q 10/08*   (2012.01)

(52) U.S. Cl.
   CPC ....... *G06Q 10/087* (2013.01); *G06K 9/00664* (2013.01); *G06K 9/325* (2013.01); *G06K 2209/01* (2013.01)

(58) Field of Classification Search
   None
   See application file for complete search history.

(56) References Cited

U.S. PATENT DOCUMENTS

| 2002/0143672 | A1* | 10/2002 | Sawasaki | ............. G06Q 10/087 705/29 |
| 2009/0059270 | A1* | 3/2009 | Opalach | ................... G06K 9/00 358/1.15 |
| 2009/0121017 | A1* | 5/2009 | Cato | ..................... G06Q 10/087 235/385 |

(Continued)

FOREIGN PATENT DOCUMENTS

| JP | 2005-228146 A | 8/2005 |
| JP | 2012-053711 A | 3/2012 |
| JP | 2014-043287 A | 3/2014 |

*Primary Examiner* — Kim Y Vu
*Assistant Examiner* — Nathan J Bloom
(74) *Attorney, Agent, or Firm* — Knobbe, Martens, Olson & Bear, LLP

(57) ABSTRACT

According to one embodiment, processing circuitry of an apparatus for managing articles acquires a check image by capturing labels including label information of a character string. The processing circuitry also acquires plan data including a plurality of plan areas indicating installation positions of the labels in the shelf and the label information of the labels assigned to each of the plan areas. The processing circuitry detects a character area of the character string displayed on each of the labels from the check image and recognizes characters in the character areas. The processing circuitry positions and superimposes the check image and the plan data and associates the character areas and the plan areas. The processing circuitry compares the label information of the associated plan areas and the recognition information of the character areas and assigns attributes to the character areas or the plan areas.

11 Claims, 15 Drawing Sheets

(56) References Cited

U.S. PATENT DOCUMENTS

| | | | | |
|---|---|---|---|---|
| 2010/0092093 A1* | 4/2010 | Akatsuka | ............. | G06K 9/6211 |
| | | | | 382/203 |
| 2011/0011936 A1* | 1/2011 | Morandi | .................. | G06K 9/00 |
| | | | | 235/454 |
| 2012/0104098 A1* | 5/2012 | Matsuda | .............. | G07G 1/0045 |
| | | | | 235/462.01 |
| 2013/0051611 A1* | 2/2013 | Hicks | ................. | G06Q 10/0875 |
| | | | | 382/103 |
| 2013/0182899 A1* | 7/2013 | Naito | .................. | G06K 9/6201 |
| | | | | 382/103 |
| 2014/0006229 A1* | 1/2014 | Birch | .................. | G06Q 10/087 |
| | | | | 705/28 |
| 2014/0064559 A1* | 3/2014 | Sugasawa | .......... | G06K 9/00671 |
| | | | | 382/103 |
| 2015/0379300 A1* | 12/2015 | Terada | ............... | G06K 9/00469 |
| | | | | 726/28 |
| 2017/0300926 A1* | 10/2017 | Stout | ................... | G06Q 30/018 |

* cited by examiner

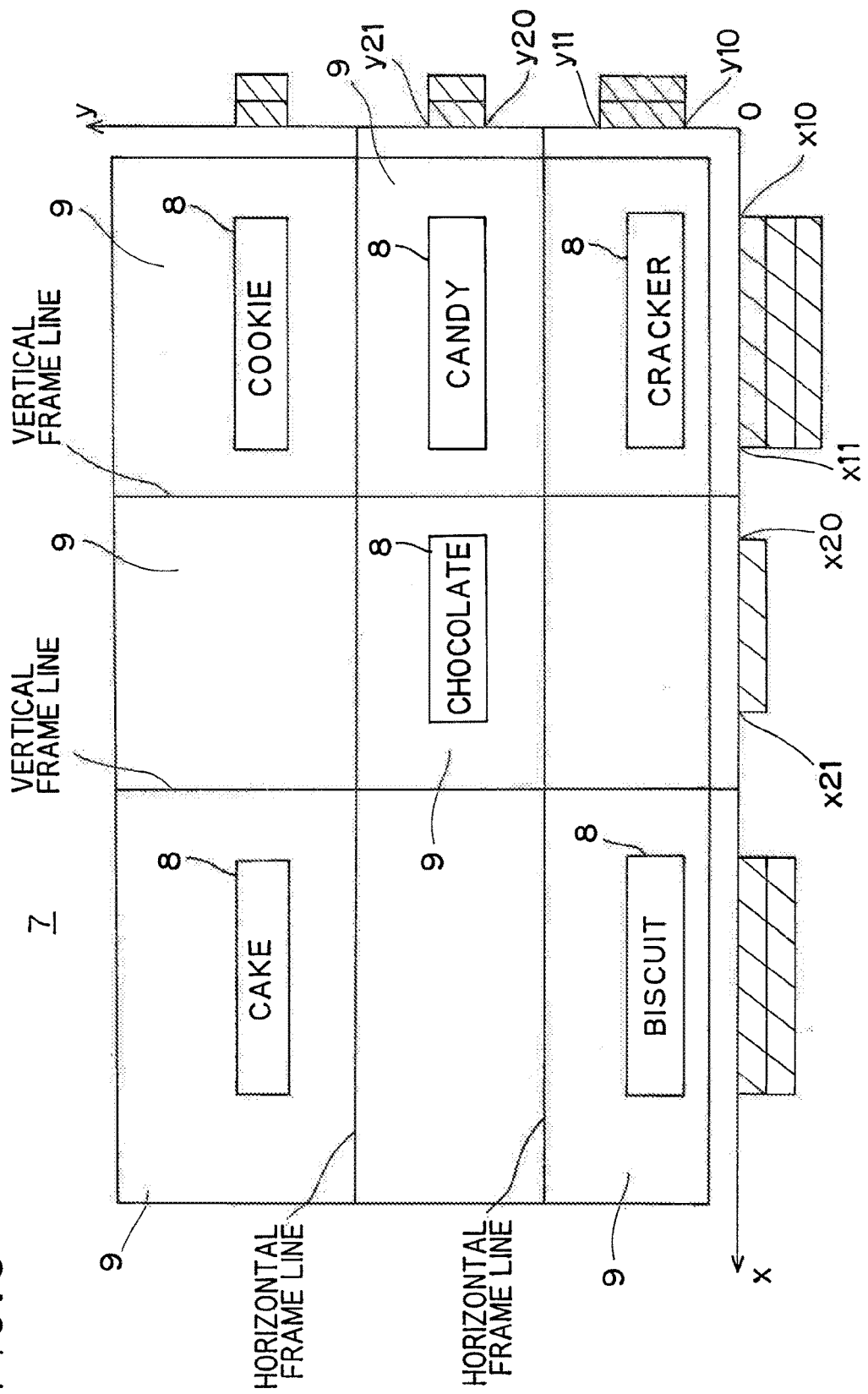

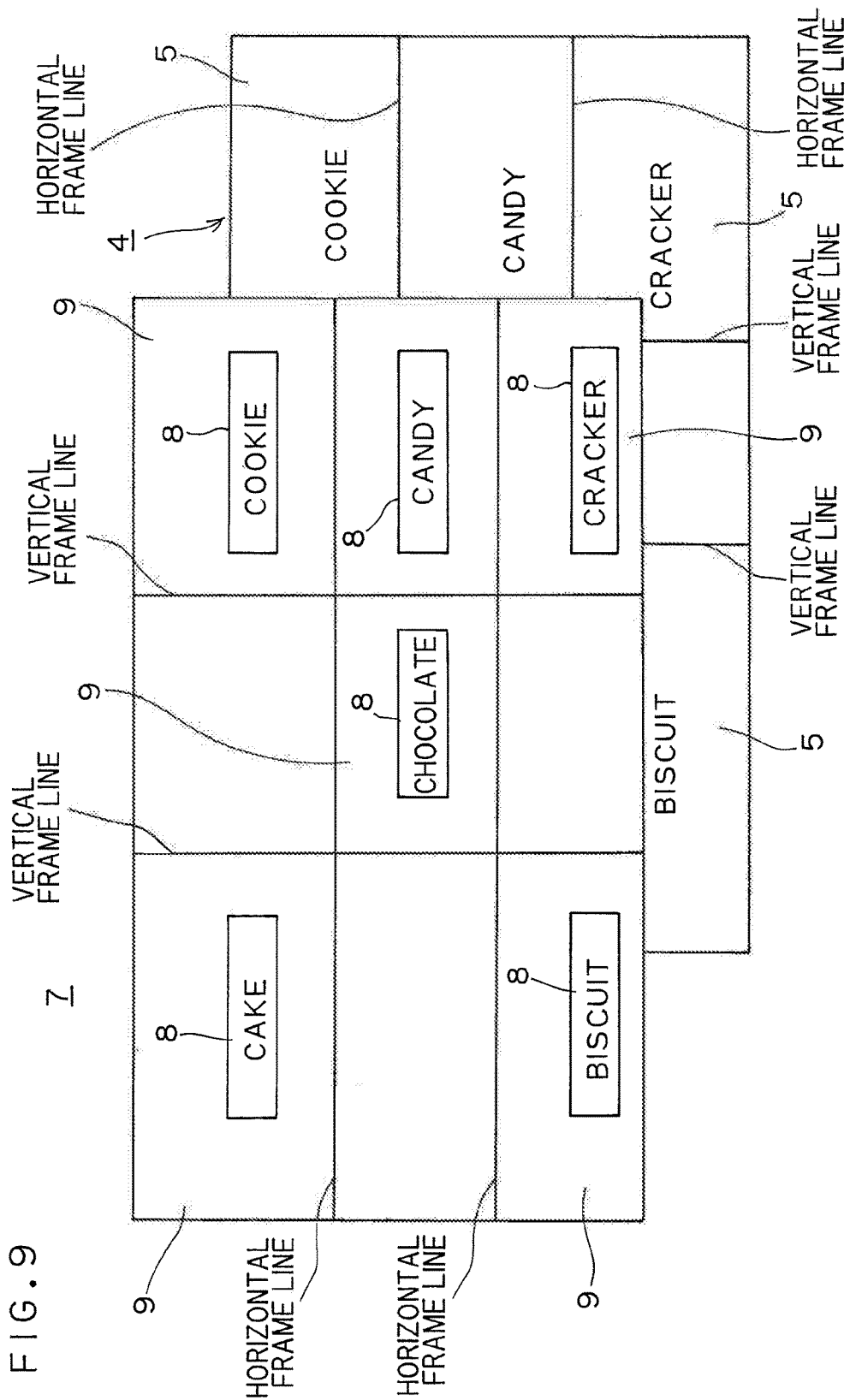

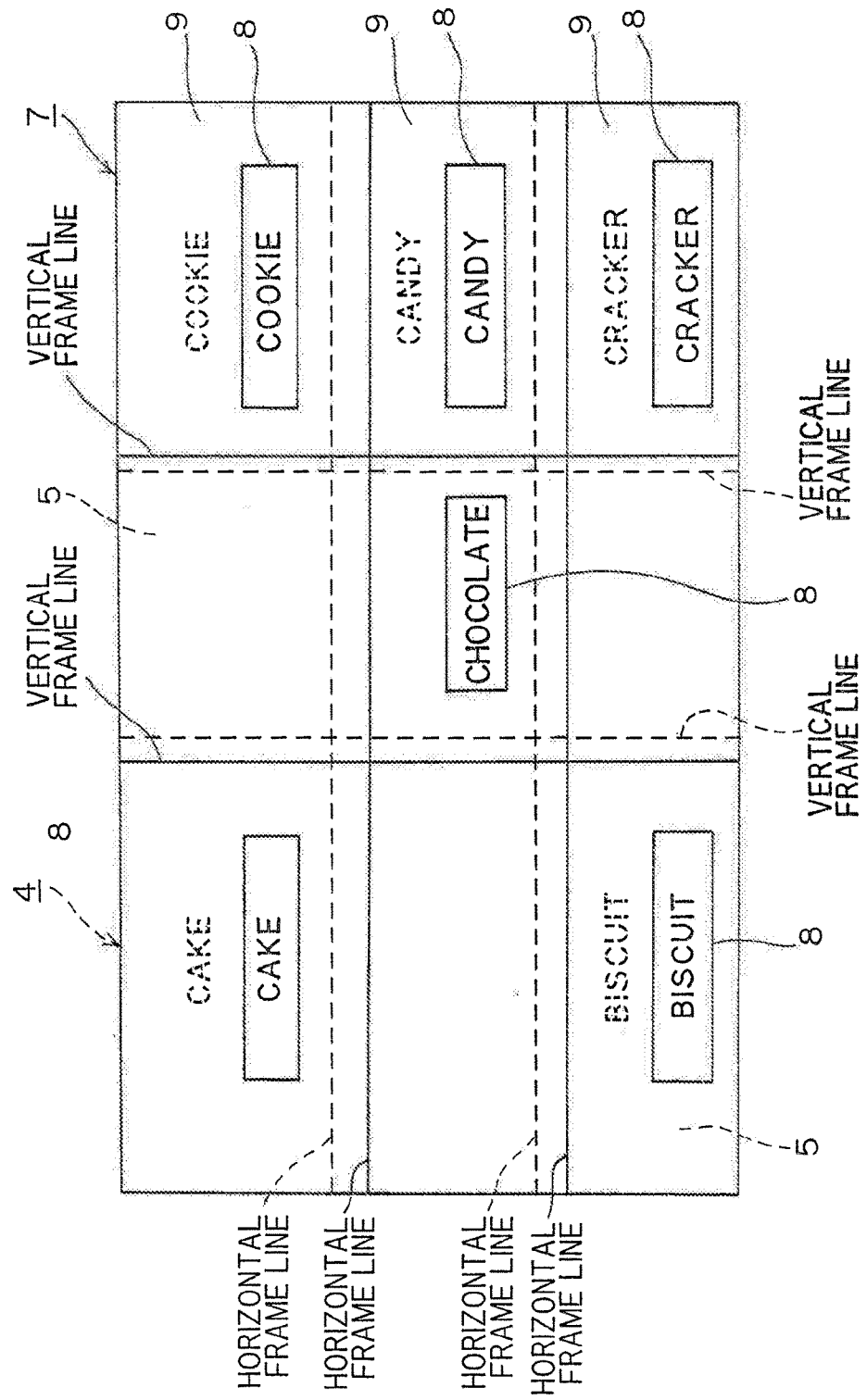

FIG.12

| WORK NUMBER | PLAN DATA | | CHECK DATA | | | DETECTION LIKELIHOOD | RECOGNITION SCORE | MATCHING DEGREE | ATTRIBUTE |
|---|---|---|---|---|---|---|---|---|---|
| | PLAN AREA | LABEL INFORMATION | DETECTION RANGE | RECOGNITION INFORMATION | | | | | |
| 1 | — | — | 30.0,40.0,35.1,40.2 | GUM | | 0.8 | 0.7 | 0 | 4 POSITION ERROR |
| | — | — | 30.0,35.0,35.0,35.1 | | | | | | |
| 2 | 1.0,9.0,5.0,9.0 | CHOCOLATE | — | — | | 0 | 0 | 0 | 2 INSTALLATION FORGOT |
| | 1.0,1.0,5.0,1.0 | | — | — | | | | | |
| 3 | 41.0,48.0,47.0,48.0 | COOKIE | 40.9,47.9,46.8,48.8 | — | | 0.8 | 0.2 | 0.7 | 5 INSTALLATION DEFICIENCY |
| | 41.0,42.0,47.0,42.0 | | 41.4,41.7,47.1,41.7 | | | | | | |
| 4 | 8.0,15.0,12.0,15.0 | BISCUIT | 8.2,15.1,11.9,15.2 | BISCUIT | | 0.9 | 0.8 | 0.9 | 1 NORMAL |
| | 8.0,5.0,12.0,5.0 | | 8.1,5.4,12.2,4.9 | | | | | | |
| 5 | 10.0,20.0,14.0,20.0 | CRACKER | 10.5,20.4,13.9,20.8 | COOKIE | | 0.8 | 0.7 | 0.1 | 3 WRONG INSTALLATION |
| | 10.0,17.0,14.0,17.0 | | 10.3,16.9,13.8,17.1 | | | | | | |
| 6 | 50.0,58.0,57.0,58.0 | BISCUIT | 50.0,58.0,56.9,58.4 | CHOCOLATE | | 0.7 | 0.2 | 0.2 | 6 TO BE CONFIRMED |
| | 50.0,50.0,57.0,50.0 | | 50.1,50.1,57.0,50.2 | | | | | | |

APPARATUS, METHOD, AND PROGRAM FOR MANAGING ARTICLES

CROSS-REFERENCE TO RELATED APPLICATIONS

This application is based upon and claims the benefit of priority from the prior Japanese Patent Application No. 2015-215971, filed on Nov. 2, 2015; the entire contents of which are incorporated herein by reference.

FIELD

Embodiments described herein relate to an apparatus, method, and program for managing articles.

BACKGROUND

In a conventional article managing apparatus, articles and character strings in an article database held in advance are collated from an image obtained by capturing an article, and a stock list is updated based on a result of the collation.

However, in such an article managing apparatus, when the number of articles is large, there may be a number of mismatches between the result of the collation and the stock list, which may cause a problem in that it is troublesome for an operator to check these mismatches.

To overcome the above problem, it is, therefore, an object of an embodiment of the present invention to provide an apparatus, method, and program for managing articles, which is capable of increasing efficiency of a work of checking installation conditions of labels provided to manage articles.

BRIEF DESCRIPTION OF THE DRAWINGS

FIG. 8 is an explanatory view of setting of a vertical frame line and a horizontal frame line in the check image;

FIG. 9 is an explanatory view of a state in which a check image and plan data are being superimposed;

FIG. 10 is an explanatory view of a state in which a check image and plan data have been superimposed;

FIG. 12 is an explanatory view of a work list;

DETAILED DESCRIPTION

According to one embodiment, there is provided an apparatus for managing articles, including: processing circuitry configured to: acquire a check image by capturing a shelf on which a plurality of articles are arranged and labels which are installed on a front surface of the shelf or front surfaces of the articles and include label information of a character string including one of characters, numbers, and symbols provided to manage the articles, and plan data including a plurality of plan areas indicating installation positions of the labels in the shelf and the label information of the labels assigned to the respective plan areas; detect a character area of the character string displayed on each of the labels from the check image; recognize characters in the character areas; position and superimpose the check images and the plan data and associate each of the character areas and each of the plan areas; and compare the label information of the associated plan areas and the recognition information of the associated character areas and assign attributes to the character areas or the plan areas, each of the attributes indicating a state related to correctness or incorrectness of installation of the articles which can be obtained from matching or mismatching between the label information and the recognition information.

Hereinafter, an article managing apparatus 10 of an embodiment of the present invention will be described with reference to the drawings.

Figure 14:
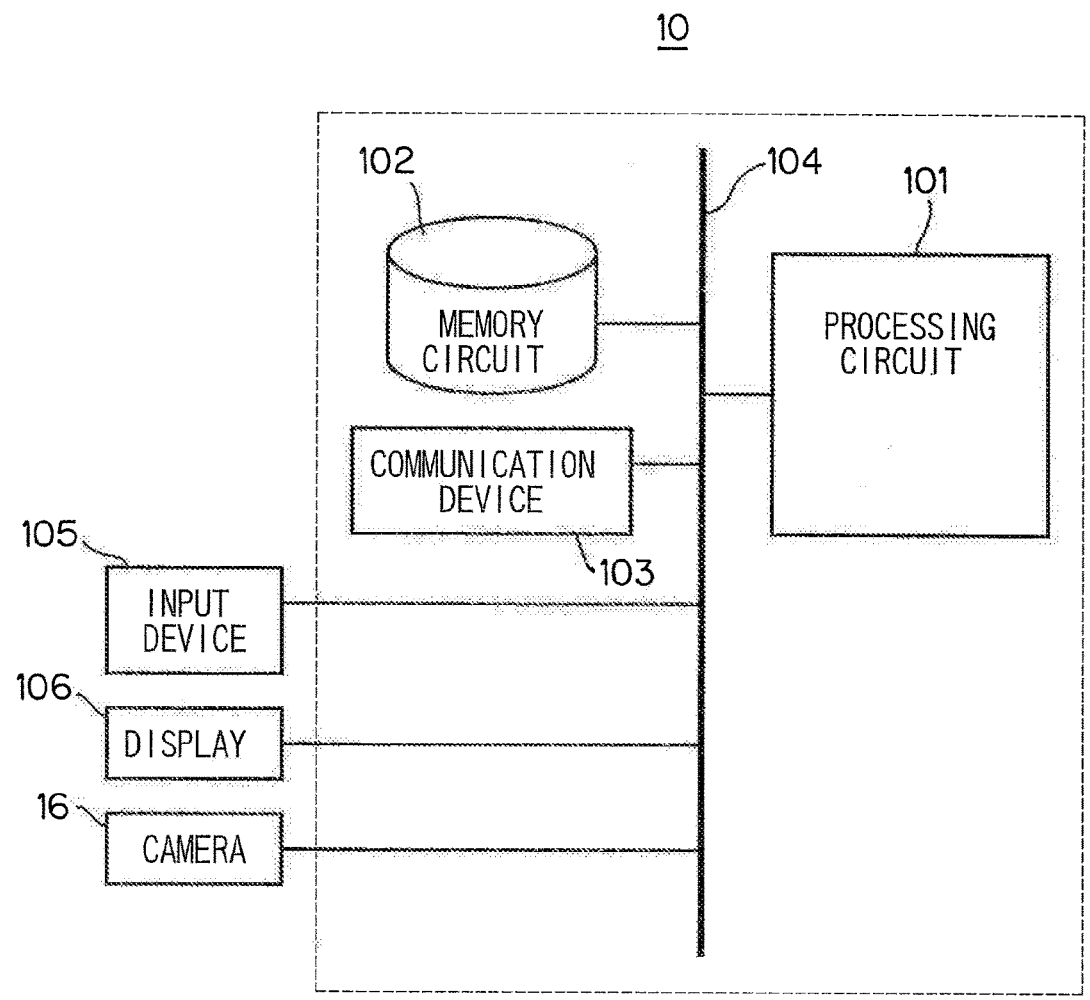
FIG. 14 is a block diagram illustrating the hardware configuration of an article managing apparatus.

The article managing apparatus 10 of this embodiment is, for example, a dedicated or general-purpose computer, as illustrated in FIG. 14. The article managing apparatus 10 includes a bus 104 connecting a camera 16, a processing circuit 101, a memory circuit 102, and a communication device 103.

The processing circuit 101 includes an acquisition unit 11, a detection unit 12, a recognition unit 13, a positioning unit 14, and a list creation unit 15. Although the function related to this embodiment has been mainly illustrated in the example of FIG. 14, the respective units of the processing circuit 101 are not limited thereto. The function of each of the units will be described later.

The function of each unit performed in the article managing apparatus 10 is stored in the memory circuit 102 in the form of a computer-executable program. The processing circuit 101 is a processor for reading and executing a program from the memory circuit 102 to implement a function corresponding to the program. The processing circuit 101 in a state of reading each program has the function of each unit represented in the processing circuit 101 of FIG. 14. Although it is illustrated in FIG. 14 that the functions performed in the acquisition unit 11, the detection unit 12, the recognition unit 13, the positioning unit 14, and the list creation unit 15 are implemented in a single processing circuit 101, these functions may be implemented by constructing the processing circuit 101 in combination of a plurality of independent processors and causing the processors to execute their respective programs. Each processing function may be configured as a program, a single processing circuit 101 may execute each program, or a specified function may be installed in a dedicated independent program executing circuit.

The acquisition unit 11, the detection unit 12, the recognition unit 13, the positioning unit 14, and the list creation unit 15 included in the processing circuit 101 are examples of an acquisition module, a detection module, a recognition module, a positioning module, and a list creation module, respectively.

The term "processor" used herein refers to one of, e.g., a central processing unit (CPU), a graphical processing unit (GPU), an application specific integrated circuit (ASIC), and a programmable logic device (e.g., a simple programmable logic device (SPLD), a complex programmable logic device (CPLD) or a field programmable gate array (FPGA)). The processor implements a function by reading and executing a program stored in the memory circuit 102. Instead of storing a program in the memory circuit 102, the program may be directly inserted in a circuit of the processor. In this case, the processor implements the function by reading and executing the program inserted in the circuit of the processor.

The memory circuit 102 stores data (e.g., plan data) and the like associated with the functions of the various units performed by the processing circuit 101, as necessary. The memory circuit 102 stores programs of the functions of the various units. For example, the memory circuit 102 is a semiconductor memory device such as a random access memory (RAM) or a flash memory, a hard disk, an optical disc, or the like. A process performed by the memory circuit 102 in the processing circuit 101 may be performed by an external storage device of the article managing apparatus 10. The memory circuit 102 may be a storage medium which stores or temporarily stores a program downloaded from a local area network (LAN), Internet or the like. The storage medium is not limited to a single form. The storage medium may be included in the storage medium of the embodiment even when the process in the above-described embodiment is executed from a plurality of media. The storage medium may have any configuration.

The communication device 103 is an interface for performing an input/output operation of information with an external device connected either by a wire or wirelessly. The communication device 103 may conduct communication in access to a network. For example, the communication device 103 acquires position information of an automobile 2 measured by GPS and information (accident, congestion or the like) about road conditions.

An input device 105 receives a variety of instructions and information related to the article managing apparatus 10 from an operator. The input device 105 is, e.g., a pointing device such as a mouse or a trackball, or a keyboard.

A display 106 displays a variety of information about the article managing apparatus 10. The display 106 is a display device such as a liquid crystal display device. The display 106 displays, e.g., a check image 7.

In this embodiment, the input device 105 and the display 106 are connected to the article managing apparatus 10 by a wire or wirelessly. The input device 105 and the display 106 may be connected to the article managing apparatus 10 via a network.

In one embodiment, a computer or an insertion system is provided to execute each process in the embodiment based on a program stored in a storage medium and may be a single device such as a personal computer or a microcomputer, or alternatively may be any system including a plurality of devices connected to a network.

The term "computer" used herein is not limited to a personal computer but may refer generally to devices and apparatuses capable of implementing the functions in the embodiment by means of a program, including an arithmetic processing device included in an information processing apparatus, a microcomputer, etc.

First Embodiment

Hereinafter, an article managing apparatus 10 of a first embodiment will be described with reference to FIGS. 1 to 12. A situation where the article managing apparatus of this embodiment is operated will be described below.

Figure 4:
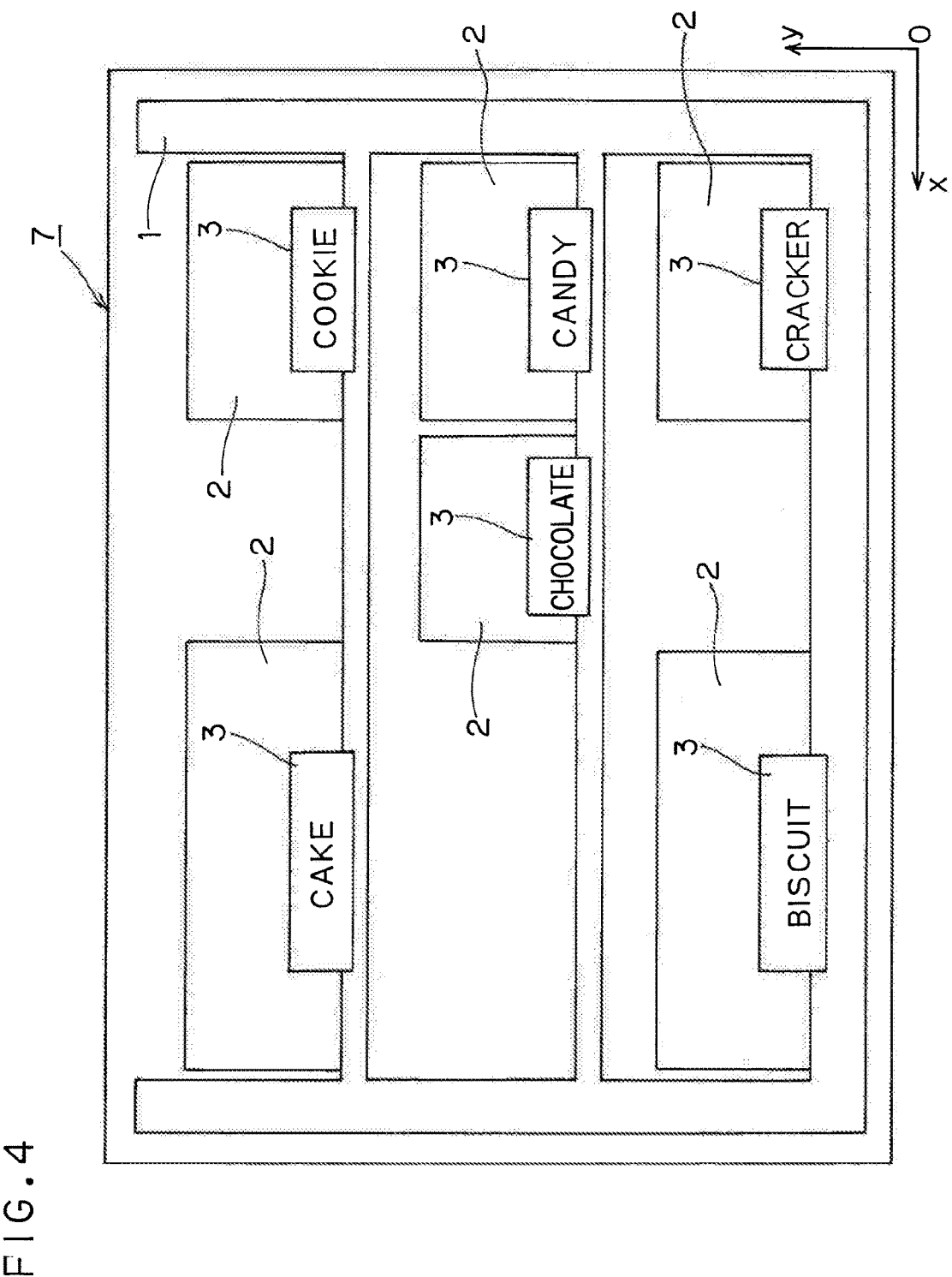
FIG. 4 is an explanatory view of a check image.
Figure 5:
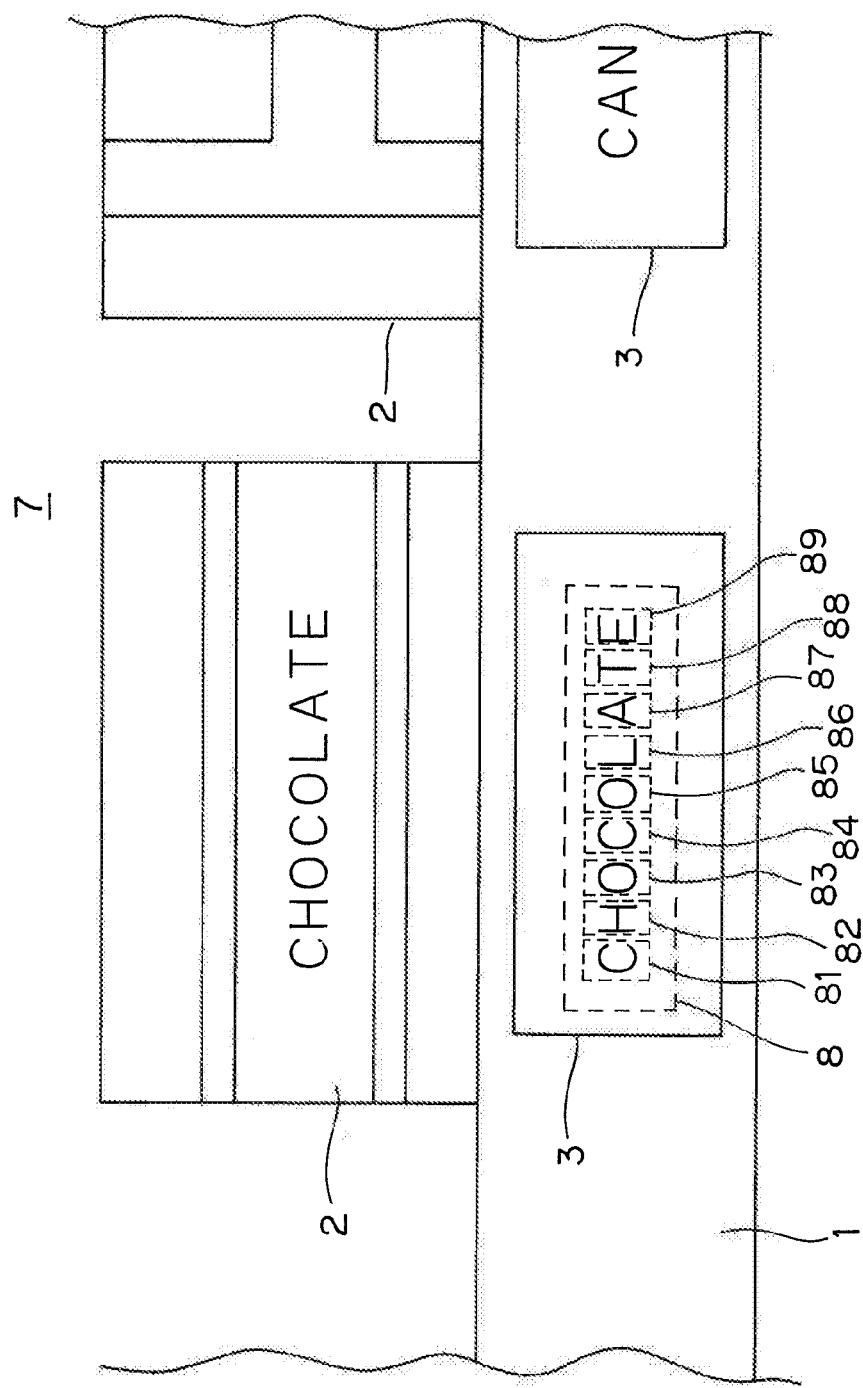
FIG. 5 is an enlarged view of a label in the check image.

As illustrated in FIG. 4, a shelf 1 is placed in a warehouse, a shop, a room or the like, and various kinds of articles 2 are exhibited on shelf plates of the shelf 1. Labels 3 corresponding to the exhibited articles 2 are attached to the front surface of the shelf 1 or the front surfaces of the articles 2. The term "label" used herein refers to an article label or an article tag with a character string (e.g., "chocolate," "cake," and "2B-1523") including one of characters, numbers, and symbols provided to manage the articles (goods) 2 to be managed. Hereinafter, information of the character string indicated in the labels 3 will be referred to as "label information." It is necessary to install the labels 3 as planned to exhibition positions of the shelf 1. However, there are some cases where different labels 3 are installed to the corresponding exhibition positions or the labels 3 are not installed at all.

Figure 3:
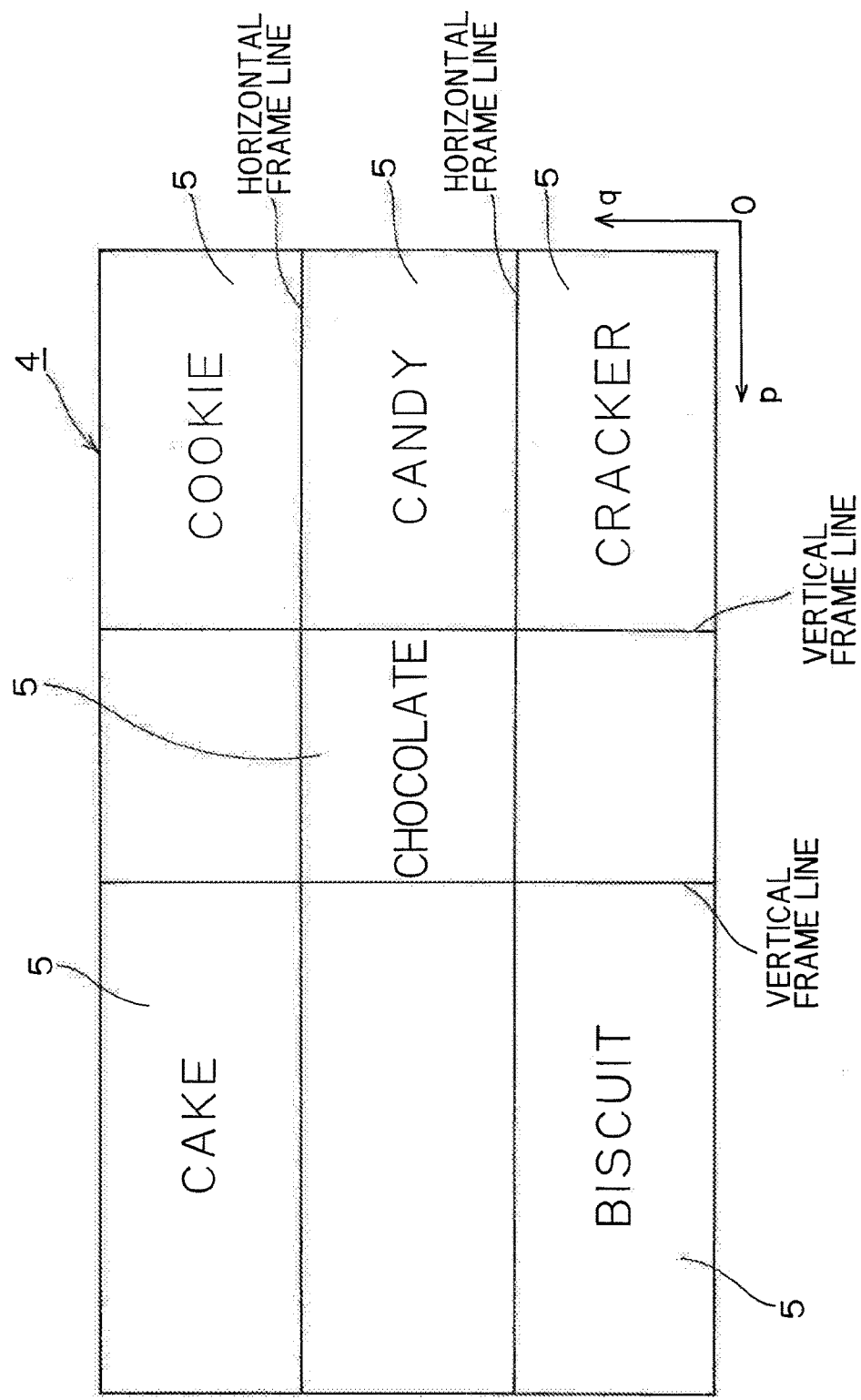
FIG. 3 is an explanatory view of plan data.

Therefore, plan data 4 is prepared to prevent such wrong installation of the labels 3. The term "plan data" 4 used herein refers to a plan to determine how to exhibit the articles 2 on the shelf 1 based on the state of sales and shipment. The plan data 4 is composed of plan areas 5 indicating a range of installation of the labels 3 installed in the front surfaces of the articles 2 exhibited on the shelf 1 and label information 6 of the labels 3 which is assigned to each of the plan areas 5. That is, as illustrated in FIG. 3, the plan data 4 includes the plan areas 5 indicating installation positions of the labels 3 installed in the shelf 1 and the label information 6 corresponding to each of the plan areas 5. For example, as illustrated in FIG. 4, it is assumed that a label 3 of "biscuit" and a label 3 of "cracker" are installed from the lowermost left side of the shelf 1. In this case, as illustrated in FIG. 3, a plan area 5 assigned with label information 6 of "biscuit" and a plan area 5 assigned with label information 6 of "cracker" are expressed from the lowermost left side of the plan data 4.

First, the article managing apparatus 10 captures, by using the camera 16, the shelf 1 to be checked for the installation conditions of the labels 3 of the articles 2, and acquires an image 7 including a plurality of captured labels 3 (hereinafter, referred to as a "check image").

Next, the article managing apparatus 10 compares the check image 7 and the plan data 4 with each other to detect whether a correct label 3, a different label 3 or no label 3 is installed at a planned installation position, and obtains an attribute to create a work list. The term "attribute" used herein includes normal installation of the label 3, incorrect installation of the label 3, forgetting of installation of the label 3, etc.

Next, the article managing apparatus 10 assigns an attribute to a position of the label 3 on the check image 7 based on the work list, and outputs the check image 7.

The configuration of the article managing apparatus 10 will be described based on the block diagram of FIG. 1 and the flow chart of FIG. 2.

Figure 1:
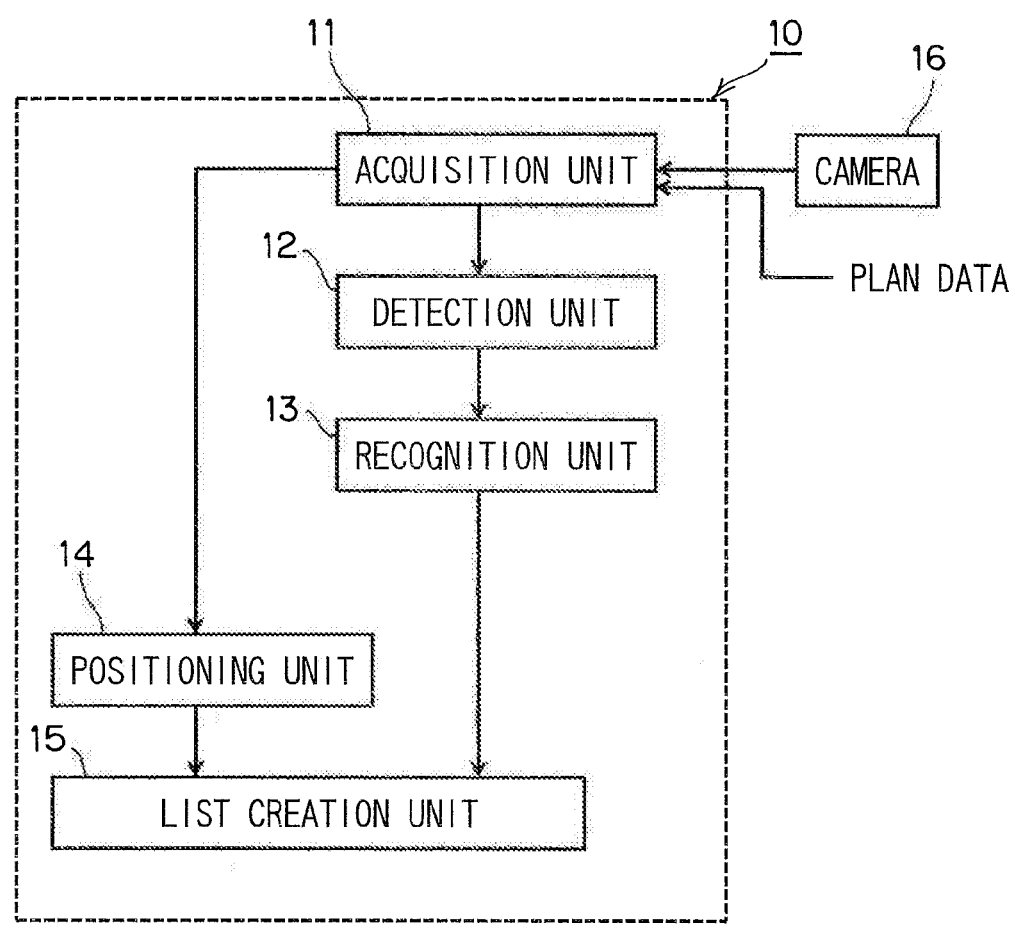
FIG. 1 is a block diagram of an article managing apparatus according to a first embodiment of the present invention.

As illustrated in FIG. 1, the article managing apparatus 10 includes the acquisition unit 11, the detection unit 12, the recognition unit 13, the positioning unit 14, and the list creation unit 15.

Figure 2:
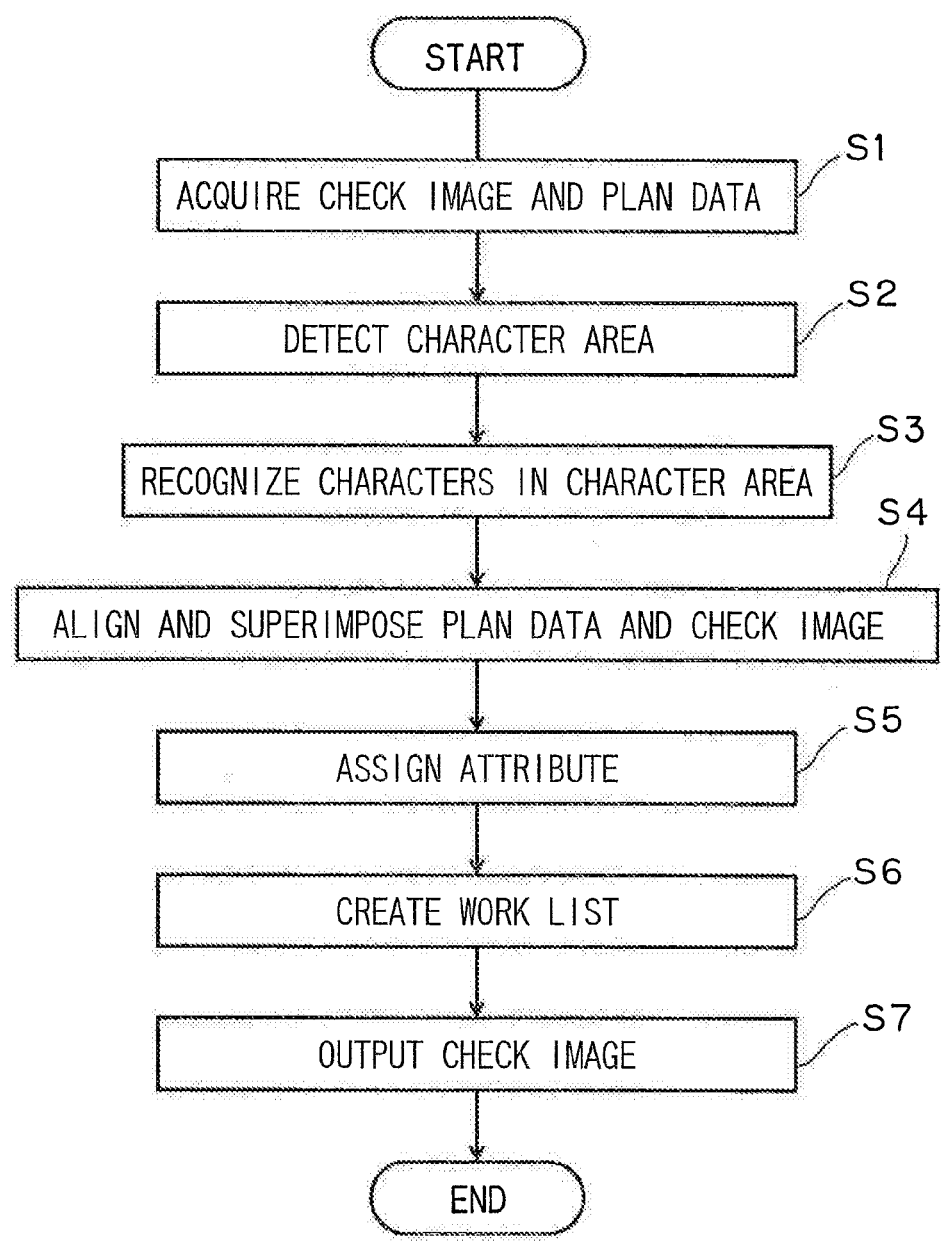
FIG. 2 is a flow chart of the article managing apparatus.

The acquisition unit 11 acquires the plan data 4 from an external device or an internal memory, and acquires the check image 7 from the camera 16 (Step S1 in FIG. 2).

The detection unit 12 detects a character area 8 including a character string indicated in the label 3 reflected on the check image 7 (Step S2 in FIG. 2).

The recognition unit 13 recognizes a character from the detected character area 8. Hereinafter, the recognized character string will be referred to as "recognition information" (Step S3 in FIG. 2).

The positioning unit 14 aligns and superimposes the character area 8 of the label 3 in the check image 7 and the plan area 5 having each label 3 of the plan data 4 one above the other (Step S4 in FIG. 2).

The list creation unit 15 obtains an attribute by comparing the label information 6 assigned to the plan area 5 with, for example, the recognition information recognized from the label 3 in the check image 7 (Step S5 in FIG. 2). The list creation unit 15 creates the work list based on the attribute for each character area 8 in the check image 7 (Step S6 in FIG. 2) and assigns the attribute to the check image 7 based on the work list and outputs the check image 7 (Step S7 in FIG. 2).

Next, processes of the units 11 to 15 of the article managing apparatus 10 will be described in detail in order.

The acquisition unit 11 acquires the plan data 4 illustrated in FIG. 3 from an external device or an internal memory and the check image 7 illustrated in FIG. 4 from the camera 16. In this embodiment, the check image 7 is one still image. The check image 7 input to the acquisition unit 11 is output to the detection unit 12, and the plan data 4 input to the acquisition unit 11 is output to the positioning unit 14.

The plan data 4 will be described based on FIG. 3. The label information 6 assigned to the plan area 5 of the plan data 4 is a character string including a number string uniquely indicating the articles 2 to be managed and a symbol string including alphabets. For example, the character string is a management code (e.g., 1011-1123 or 1A-1123) of the articles 2. When a specific management code is not assigned, the character string may be assigned with an article name such as "biscuit" or "cookie," or an article name including an attribute of a place of production such as "Japanese made chocolate" or "Belgium made chocolate."

As information specifying an area where the label 3 is installed on the shelf 1, the plan area 5 is expressed as a rectangular area corresponding to the condition (see FIG. 4) of the shelf 1 on which the label 3 is installed. The plan area 5 is expressed by four coordinate values (e.g., a left upper coordinate value, a right upper coordinate value, a left lower coordinate value, and a right lower coordinate value) of a two-dimensional data coordinate system set for the plan data 4. The data coordinate system is an orthogonal coordinate system which has its origin in the left lower portion of the plan data 4 and includes a p axis and a q axis, for example as illustrated in FIG. 3. However, the plan area 5 is not limited thereto but may be expressed by any ways as long as the size of an area of arrangement of the articles 2 and the relative relationship between areas of arrangements of the articles 2 can be known. In addition, the plan data 4 may include a label 3 of the same article 2 at a plurality of installation positions. An empty plan area to which no label information is assigned is installed in an area where the label 3 is not installed. This plan data 4 will be described in more detail later.

A two-dimensional image coordinate system is set for the check image 7, and a position of the label 3 on the check image 7 is expressed by a coordinate value of the two-dimensional image coordinate system. The image coordinate system is an orthogonal coordinate system which has its origin in the left lower portion of the check image 7 and includes an x axis and a y axis, for example as illustrated in FIG. 4.

The detection unit 12 detects an area of the character string (hereinafter, referred to as a "character area 8") indicating the label information 6 in the check image 7 input from the acquisition unit 11, its detection position, and a detection likelihood L. Then, the detection unit 12 outputs the check image 7 and the detected character area 8, the detection position, and the detection likelihood L illustrated in FIG. 7 to the recognition unit 13.

A method by which the detection unit 12 detects the character area 8 captured in the check image 7 will be described based on FIG. 3.

First, the detection unit 12 detects character components 81 to 89 (one or more consecutive pixels) constituting all or some of a character from the check image 7, as will be described in detail later.

Second, the detection unit 12 selects character components estimated to be contained in the same character string, from the detected character components 81 to 89. In this example, the detection unit 12 selects the character components 81 to 89.

Figure 7:
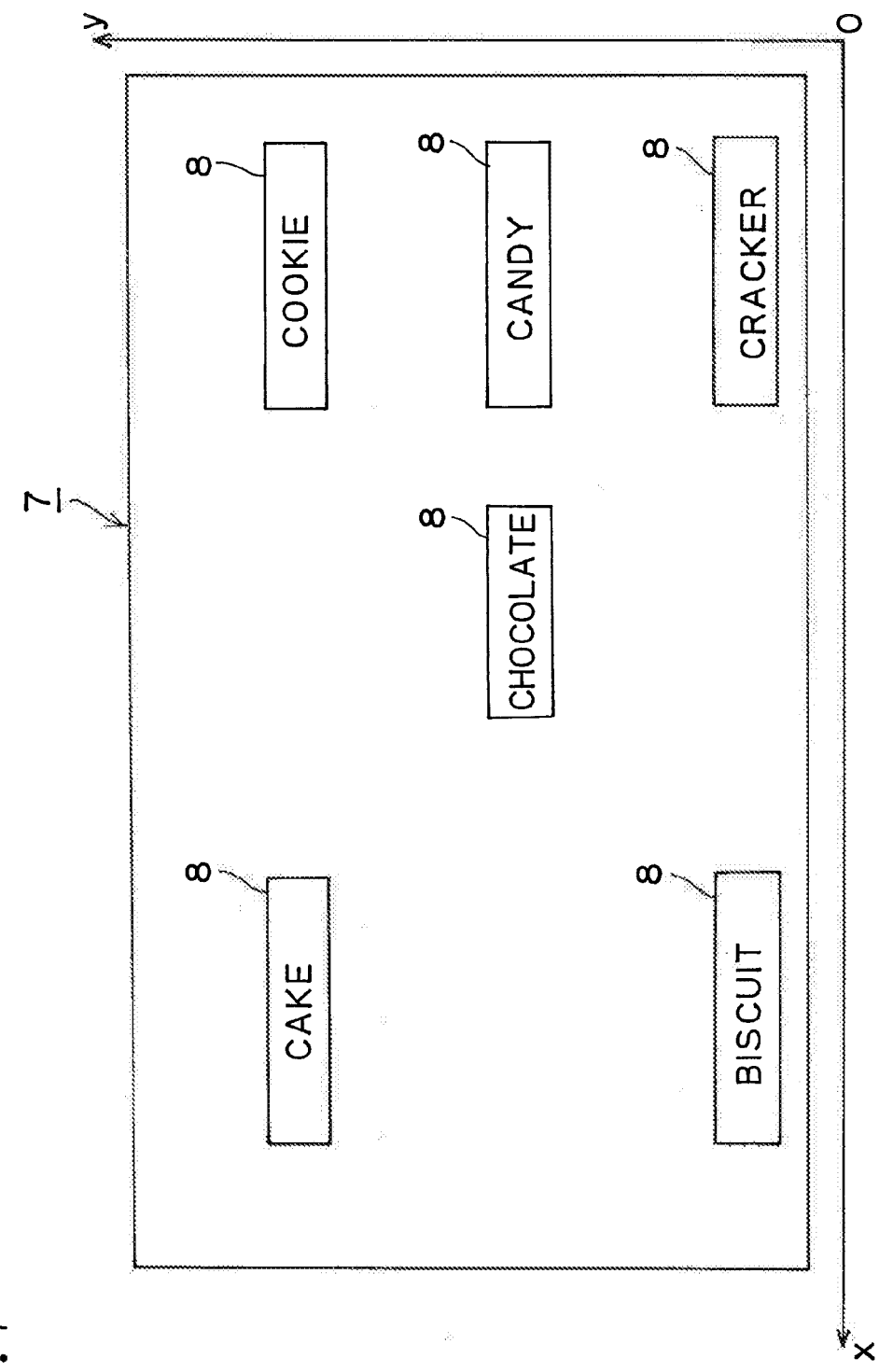
FIG. 7 is an explanatory view of detection of a character area from the check image.

Third, the detection unit 12 detects a detection position of an area (character area) 8 reflecting one or more characters from the check image 7, as illustrated in FIG. 7, by acquiring direction and height information of the character string, based on the selected character components 81 to 89. The term "detection position" used herein refers to representing a range of detection of the character area 8 as four coordinate values (e.g., a left upper coordinate value, a right upper coordinate value, a left lower coordinate value, and a right lower coordinate value) of the two-dimensional image coordinate system on the check image 7. In addition, a method of detecting one or more character areas 8 from the check image 7 may use a method disclosed in Japanese Laid-Open Patent Publication No. 2005-309771, or other methods known in the art. At this time, the detection unit 12 also calculates the detection likelihood L.

Figure 6:
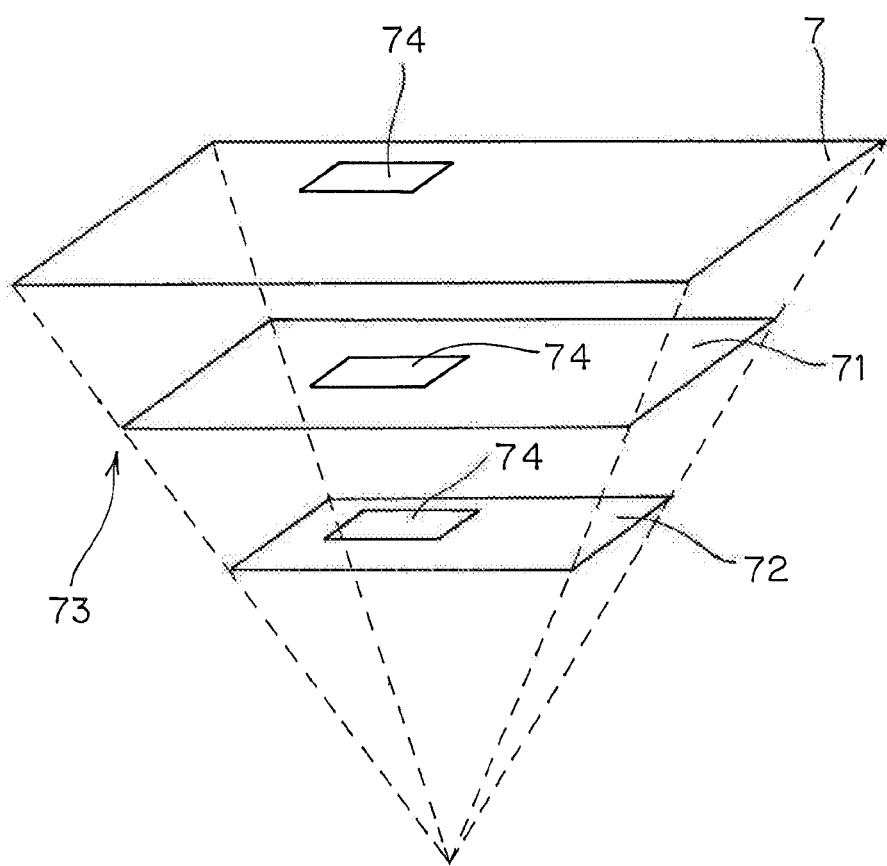
FIG. 6 is an explanatory view of a resolution pyramid check image when performing detection of a character area.

A method by which the detection unit 12 detects the character components from the check image 7 will be described based on FIG. 6.

The detection unit 12 sequentially reduces the check image 7 in size at a constant ratio r (0<r<1), so that one or more resized check images 71 and 72 are generated. The detection unit 12 generates a resolution pyramid check image 73 by arranging the check image 7 and the resized check images 71 and 72 vertically in such a manner that the centers thereof are aligned. The detection unit 12 cuts out corresponding parts in the check image 7 and the resized check images 71 and 72 included in the resolution pyramid check image 73 by a detection window 74 having a predetermined size to thereby generate three partial check images. The detection unit 12 uses a character detection dictionary that has learned character images and non-character images in advance to collate the three partial check images. The detection unit 12 obtains a detection likelihood L indicating the likelihood of being a character through this collation. When the detection likelihood L exceeds a detection threshold for detection of character components, the detection unit 12 detects each partial image as a character component. In addition, the detection unit 12 stores the detection likelihood L. The detection likelihood L can be obtained by a known technique such as pattern recognition using the subspace method, the support vector machine, or the like.

The recognition unit 13 recognizes the recognition information, which exists in each of the character areas 8 detected by the detection unit 12, by using a character recognition method known in the art. At this time, the recognition unit 13 also obtains a recognition score M indicating a degree of character recognition. Then, the recognition unit 13 outputs the check image 7, the character area 8, the detection position, the detection likelihood L, recognition information, and the recognition score M to the positioning unit 14.

In addition, the recognition unit 13 calculates a recognition score M indicating the likelihood of a recognized character string, from the closeness to the character pattern and language corpus pre-learned to recognize a character.

The positioning unit 14 positions and overlays the check image 7 and the plan data 4 and associates and outputs the character area 8 of the check image 7 and the plan area 5 of the plan data 4 to the list creation unit 15.

A positioning method will be described below based on FIGS. 3 and 7 to 10.

First, the positioning unit 14 acquires, from the plan data 4, the number of plan areas 5 parallelized in the horizontal direction of the plan data 4 (hereinafter, referred to as the number of rows), the number of plan areas 5 parallelized in the vertical direction of the plan data 4 (hereinafter, referred to as the number of columns), the number of vertical frame lines partitioning the plan areas 5 parallelized in the horizontal direction of the plan data 4, and the number of horizontal frame lines partitioning the plan areas 5 parallelized in the vertical direction of the plan data 4, as illustrated in FIG. 3.

Second, the positioning unit 14 obtains a projective section (x10, x11) by projecting an x-axial existence section (x10, x11) of a character area 8 in the check image 7 in the image coordinate system onto the x axis, as illustrated in FIGS. 7 and 8.

In addition, the positioning unit 14 obtains a projective section (x20, x21) by projecting an x-axial existence section (x20, x21) of another character area 8 in the check image 7 in the image coordinate system onto the x axis, as illustrated in FIGS. 7 and 8.

In this manner, the positioning unit 14 obtains all projective sections of the x axis by projecting x-axial existence sections of all character areas 8 in the check image 7, as illustrated in FIGS. 7 and 8.

Then, the positioning unit 14 sets the center of a section having no projective section on the x axis as a position of a vertical frame line parallel to the y axis in the check image 7, as illustrated in FIGS. 7 and 8.

Third, the positioning unit 14 obtains a projective section (y10, y11) by projecting a y-axial existence section (y10, y11) of a character area 8 in the check image 7 in the image coordinate system onto the y axis, as illustrated in FIGS. 7 and 8.

In addition, the positioning unit 14 obtains a projective section (y20, y21) by projecting a y-axial existence section (y20, y21) of another character area 8 in the check image 7 in the image coordinate system onto the y axis, as illustrated in FIGS. 7 and 8.

Then, the positioning unit 14 sets the center of a section having no projective section on the y axis as a position of a horizontal frame line parallel to the x axis in the check image 7, as illustrated in FIGS. 7 and 8.

In this manner, the positioning unit 14 obtains all projective sections of the y axis by projecting y-axial existence sections of all character areas 8 in the check image 7, as illustrated in FIGS. 7 and 8.

Fourth, the positioning unit 14 sets the number of vertical frame lines and the number of horizontal frame lines of the check image 7 to be equal to the number of vertical frame lines and the number of horizontal frame lines of the plan data 4, respectively, and generates a rectangular area (hereinafter referred to as a "cell 9") partitioned by the vertical frame lines and the horizontal frame lines.

Fifth, the positioning unit 14 allocates the character areas 8 to the cell 9 partitioned by the vertical frame lines and the horizontal frame lines so as not to lose a relative position relationship between adjacent character areas 8. At this time, when the vertical and horizontal relationship between the character areas 8 is not maintained, the positioning unit 14 maintains the vertical and horizontal relationship by dividing and integrating cells 9 in the character areas 8. Then, the positioning unit 14 allocates all the character areas 8 to each cell 9.

Sixth, the positioning unit 14 matches the scales of the check image 7 and the plan data 4. That is, the positioning unit 14 magnifies or reduces one of the check image 7 and the plan data 4 such that the size of the check image 7 is equal to the size of the plan data 4. The scaling ratio is obtained in advance from the size of the label 3 in the check image 7 from a capturing position of the camera 16 and the size of the label 3 in the plan data 4.

Seventh, the positioning unit 14 overlays the check image 7 and the plan data 4 by determining a position such that the cells 9 of the vertical frame lines and the horizontal frame lines including the character areas 8 match with the vertical frame lines and the horizontal frame lines of the plan area 5, as illustrated in FIG. 9.

Eighth, the positioning unit 14 associates the character areas 8 in the overlaid cells 9 and the label information 6 assigned to the plan area 5 of the plan data 4, as illustrated in FIG. 10.

In addition, even when the cell 9 and the plan area 5 are overlaid with each other, in a case where a distance between the center of the cell 9 and the center of the plan area 5 is equal to or more than a reference distance, the cell 9 and the plan area 5 may not be associated with each other. In addition, the cell 9 and the plan area 5 may be aligned with each other at a position that provides the largest number of corresponding areas when the check image 7 and the plan data 4 are overlaid with each other.

The list creation unit 15 detects a plan area 5 which can be associated with the character area 8 on the check image 7, a plan area 5 which cannot be associated with the character area 8, and a character area 8 which cannot be associated with the plan area 5, creates a work list by assigning an attribute according to the contents of the detected areas, and represents the attribute on the check image 7 based on the created work list.

First, as illustrated in FIG. 10, the list creation unit 15 compares the overlaid character area 8 and plan area 5 to determine whether or not these areas match with each other. A method by which the list creation unit determines whether or not the character area 8 and plan area 5 match with each other will be described.

First, the list creation unit 15 obtains a matching ratio K from a distance K1 between the character area 8 and the plan area 5 and a degree of matching K2 between the recognition information of the character area 8 and the label information 6 of the plan area 5. The distance K1 indicates a degree of deviation between the character area 8 and the plan area 5. The distance K1 is set to "1" when the character area 8 and the plan area 5 are at the same position, and is set to "0" when the character area 8 and the plan area 5 are separated by a predetermined distance or longer from each other. The matching degree K2 indicates a matching rate at which the characters of the recognition information and the characters of the label information 6 match with each other. The matching ratio K indicates one of the distance K1 and the matching degree K2 or a weighting addition of the distance K1 and the matching degree K2.

Second, the list creation unit 15 determines an attribute based on the detection likelihood L of the character area 8 in the check image 7, the recognition score M of the character recognition of the character area 8, and the matching ratio K between the character area 8 and the label information 6 assigned to the plan area 5 of the plan data 4. A method of determining an attribute will be described in detail later.

Third, the list creation unit 15 determines all attributes of the character area 8 in the check image 7 and creates the work list represented in FIG. 12.

Fourth, the list creation unit 15 assigns an attribute to the character area 8 at a predetermined position in the check image 7 based on the work list. A method of assigning the attribute is to change a color of the character area 8 in the check image 7 according to the contents of work performed by an operator (work indicated by an attribute).

Fifth, the list creation unit 15 outputs the check image 7 with its attribute expressed by a color to a printer or a display of a smartphone. The colors on the check image 7 used for attributes 1 to 6 are just illustrative, and the contents of attributes may be expressed by other colors or balloons.

Sixth, the operator performs a work according to the attribute while watching the check image 7 with its attribute expressed by a color.

The attributes may be as follows.

Attribute 1 has the meaning of "normal." That is, when the detection position of the character area 8 and the recognition score match with each other, and the position of the plan area 5 and the label information match with each other, it is assumed that the labels 3 are installed on the shelf 1 as planned. When expressing the attribute 1 on the check image 7, the list creation unit 15 displays the normal character area 8 on the check image 7 as it is.

Attribute 2 has the meaning of "installation forgot." That is, when the character area 8 does not exist at the position of the plan area 5, it is assumed that the labels 3 are not installed in the plan area 5. When expressing the attribute 2 on the check image 7, the list creation unit 15 displays an area without the character area 8 on the check image 7 in black.

Attribute 3 has the meaning of "wrong installation." That is, when the detection position of the character area 8 and the recognition score do not match with each other and the position of the plan area 5 and the label information do not match with each other, it is assumed that wrong labels 3 are installed. When expressing the attribute 3 on the check image 7I, the list creation unit 15 displays the character area 8 of the wrong labels 3 on the check image 7 in red.

Attribute 4 has the meaning of "installation detection position error." That is, when the plan area 5 does not exist at the position of the character area 8, it is assumed that the labels 3 are installed in an unplanned range. When expressing the attribute 4 on the check image 7, the list creation unit 15 displays the character area 8 of the labels 3 in the incorrect range on the check image 7 in yellow.

Attribute 5 has the meaning of "installation deficiency." That is, when the character area 8 exists at the position of the plan area 5, but characters cannot be recognized, it is assumed that the labels 3 are installed in a state where they are hard to be seen. When expressing the attribute 5 on the check image 7, the list creation unit 15 displays the character area 8 of the unrecognizable labels 3 on the check image 7 in blue.

Attribute 6 has the meaning of "to be confirmed." That is, this is a case where a result of recognition of the character area 8 on the check image 7 has a low reliability irrespective of the presence/absence of the plan area 5. When expressing the attribute 6 on the check image 7, the list creation unit 15 displays the character area 8 of the labels 3 to be confirmed on the check image 7 in green.

The list creation unit 15 compares the character area 8 on the check image 7 and the plan area 5 of the overlaid plan data 4 to determine whether or not they match with each other, and creates a work list by determining an attribute based on the contents thereof. Then, the list creation unit 15 expresses and outputs the attribute on the check image 7 according to the created work list.

Figure 11A:
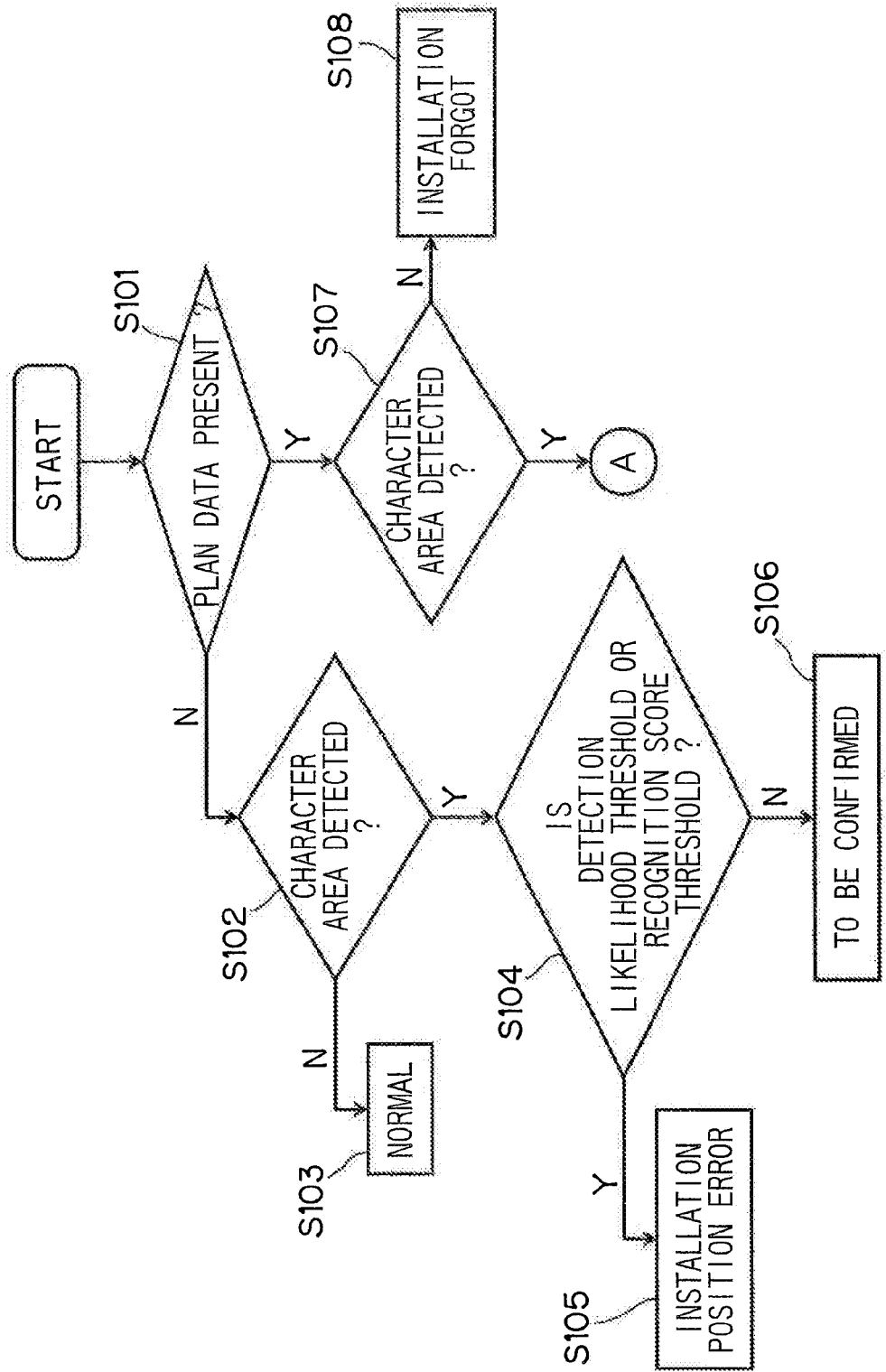
FIG. 11A is a flow chart of a process of obtaining an attribute.
Figure 11B:
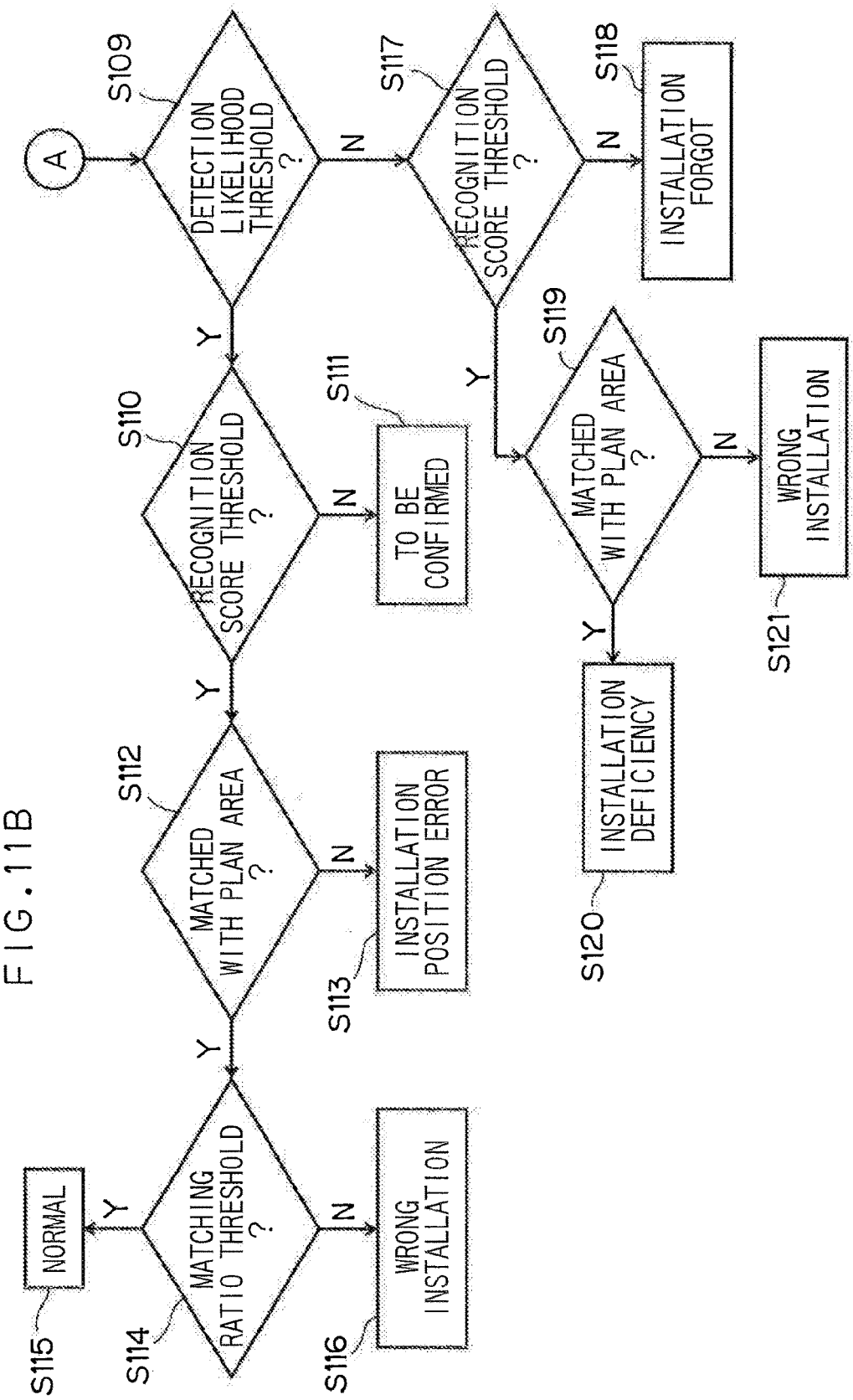
FIG. 11B is a second flow chart that continues the process of obtaining an attribute of FIG. 11A.

A method by which the list creation unit 15 determines an attribute will be described based on flow charts of FIG. 11A and FIG. 11B.

An attribute is determined based on the detection likelihood of the character area 8 in the check image 7 obtained by the detection unit 12, the recognition score of the recognition information of the character area 8 obtained by the recognition unit 13, and a degree of matching between the recognition information obtained by the list creation unit 15 and the label information 6 assigned to the plan area 5.

At Step S101, the list creation unit 15 determines whether or not the plan data 4 has been acquired. When it is determined that the plan data 4 has been acquired (Y), the method proceeds to Step S107. When it is determined that the plan data 4 has not been acquired (N), the method proceeds to Step S102.

At Step S102, when it is determined that the detection unit 12 detects the character area 8 in the check image 7 (Y), the method proceeds to Step S104. When it is determined that the detection unit 12 detects no character area 8 in the check image 7 (N), the method proceeds to Step S103.

At Step S103, the list creation unit 15 assigns an attribute of "normal" since the plan data 4 is not present and the character area 8 does not exist in the check image 7. That is, this is a case where there is no checking work.

At Step S104, when the detection likelihood of the detected character area 8 is equal to or higher than a detection threshold or the recognition score is equal to or higher than a recognition threshold (Y), the list creation unit 15 proceeds to Step S105. When it is determined that the detection likelihood is less than the detection threshold, and the recognition score is less than the recognition threshold (N), the method proceeds to Step S106.

At Step S105, since the detection likelihood is equal to or higher than the detection threshold or the recognition score is equal to or higher than the recognition threshold although the character area 8 in the check image 7 has been detected, the list creation unit 15 determines that labels are wrongly installed and assigns an attribute of "installation position error."

At Step S106, since the detection likelihood is lower than the detection threshold and the recognition score is lower than the recognition threshold although the character area 8 in the check image 7 has been detected, the list creation unit 15 determines that labels are to be confirmed and assigns an attribute of "to be confirmed."

At Step S107, since the plan data 4 is present, the detection unit 12 determines whether or not the character area 8 exists in the check image 7. When it is determined that the character area 8 exists (Y), the method proceeds to Step S109. When it is determined that no character area 8 exists (N), the method proceeds to Step S108.

At Step S108, since the plan data 4 exists and the character area 8 in the check image 7 is not recognized, the list creation unit 15 assigns an attribute of "installation forgot."

At Step S109, when it is determined that the detection likelihood detected by the detection unit 12 is equal to or higher than the detection threshold (Y), the method proceeds to Step S110. When it is determined that the detection likelihood is less than the detection threshold (N), the method proceeds to Step S117.

At Step S110, when it is determined by the list creation unit 15 that the recognition score calculated by the recognition unit 13 is equal to or higher than the recognition threshold for the character area 8 whose detection likelihood is equal to or higher than the detection threshold (Y), the method proceeds to Step S112. When it is determined that the recognition score is less than the recognition threshold (N), the method proceeds to Step S111.

At Step S111, the list creation unit 15 determines that the recognition score exists in the check image 7, and assigns an attribute of "to be confirmed."

At Step S112, when it is determined by the list creation unit 15 that the character area 8 with the detection likelihood equal to or higher than the detection threshold and the recognition score equal to or higher than the recognition threshold matches with the plan area 5 (Y), the method proceeds to Step S114. When it is determined that the character area 8 does not match with the plan area 5 (N), the method proceeds to Step S113.

At Step S113, since the recognition information recognized by the character area 8 does not match with the label information 6 assigned to the plan area 5, the list creation unit 15 determines that the labels are wrongly installed and assigns an attribute of "installation position error."

At Step S114, when it is determined by the list creation unit 15 that a matching ratio for the character area 8 matching with the plan area 5 is equal to or higher than a matching threshold (Y), the method proceeds to Step S115. When it is determined that the matching ratio is less than a matching threshold (N), the method proceeds to Step S116.

At Step S115, since the recognition score of the detected character area 8 in the check image 7 is equal to or higher than the recognition threshold and matches with the label information 6 of the plan data 4, and a matching degree indicating a gap between the plan area 5 and the character area 8 is equal to or higher than a matching threshold, the list creation unit 15 determines that the labels are normally installed and assigns an attribute of "normal."

At Step S116, since the matching ratio is lower than the matching threshold, the list creation unit 15 determines that an installation position is wrong although the contents of the labels are correct, and assigns an attribute of "wrong installation."

At Step S117, when it is determined that the detection likelihood of the character area 8 in the check image 7 detected by the detection unit 12 is lower than the detection threshold, the recognition unit 13 performs the recognition on the character area 8. When it is determined that the recognition score is equal to or higher than the recognition threshold (Y), the method proceeds to Step S119. When it is determined that the recognition score is less than the recognition threshold (N), the method proceeds to Step S118.

At Step S118, since the detection likelihood is lower than the detection threshold, and the recognition score is lower than the recognition threshold, the list creation unit 15 determines that to install labels is forgot, and assigns an attribute of "installation forgot."

At Step S119, the list creation unit 15 determines whether or not the character area 8 whose recognition score is equal to or higher than the recognition threshold matches with the label information 6 of the plan area 5, although the detection likelihood is less than the detection threshold. When it is determined that the character area 8 matches with the label information 6 (Y), the method proceeds to Step S120. When it is determined that the character area 8 does not match with the label information 6 (N), the method proceeds to Step S121.

At Step S120, since the recognition score is equal to or higher than the recognition threshold, and the recognition information matches with the label information 6, the list creation unit 15 determines that labels are hard to be detected, that is, installation of labels is deficient, and assigns an attribute of "installation deficiency."

At Step S121, since the recognition score is equal to or higher than the recognition threshold, and the recognition information does not match with the label information 6, the list creation unit 15 determines that labels are wrongly installed, and assigns an attribute of "wrong installation."

As described above, after assigning an attribute to the character area 8 in each check image 7 and the plan area 5 of the plan data 4, the list creation unit 15 creates the work list represented in the figure.

Next, the list creation unit 15 assigns the attribute to the character area 8 in the check image 7 based on the contents of this work list.

According to the article managing apparatus 10 of this embodiment, while watching the check image 7 with the expressed attributes, an operator needs only to do a work in accordance to the attributes, which results in improved work efficiency.

Second Embodiment

Next, an article managing apparatus 10 of a second embodiment will be described with reference to FIG. 13.

The article managing apparatus 10 of the second embodiment is different from that of the first embodiment in that the check image 7 is a single still image in the first embodiment, whereas the shelf 1 corresponding to the plan data 4 is divided into plural check images 7 in the second embodiment. The plural check images 7 indicate a plurality of still images or frames of a moving picture obtained by capturing the shelf 1. The following description will be focused on a configuration of integration of the plural check images 7 in a single check image 7. Hereinafter, the plural check images 7 will be referred to as division images 701 and 702, and the single check image 7 thus integrated will be referred to as a composite image 705.

The second embodiment is a case where illumination conditions are constant, and a plurality of division images is captured by varying a capturing angle of the camera 16. That is, the second embodiment is to acquire plural division images by capturing the shelf 1 while varying the capturing angle of the camera 16.

Figure 13A:
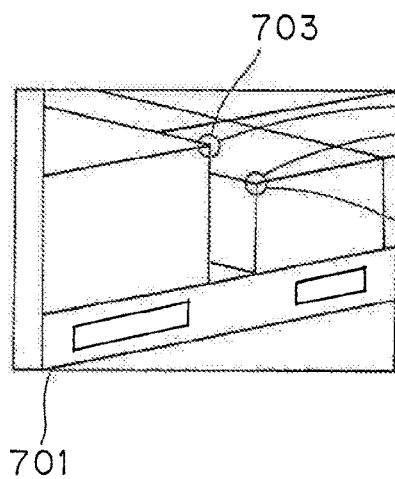
FIGS. 13A and 13B are explanatory views of partitioned images.
Figure 13B:
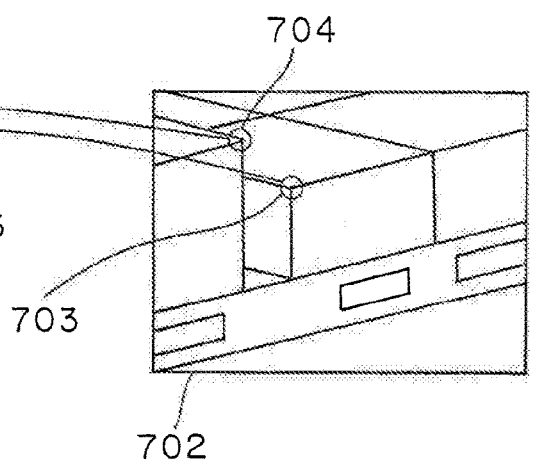

First, the acquisition unit 11 acquires the plural division images 701 and 702 while varying the capturing angle of the camera 16, as illustrated in FIGS. 13A and 13B.

Second, the positioning unit 14 calculates local features reflected on the division images 701 and 702 and determines the most similar points 703 and 704 among local features of the division images as correspondence points. The term "local feature" used herein indicates an area of points which are not changed by rotation, enlargement, and reduction and have stable characteristics in the division images 701 and 702.

Figure 13C:
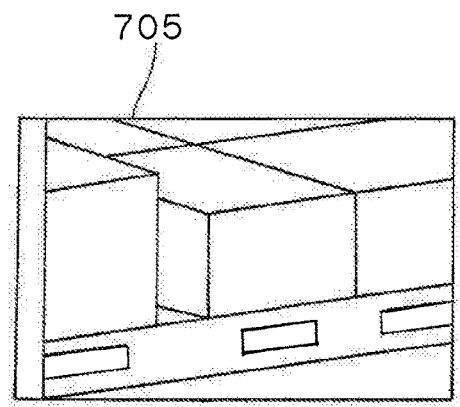
FIG. 13C is an explanatory view of a composite image.

Third, the positioning unit 14 estimates the shift amount and deformation amount of the two division images 701 and 702 from the plurality of determined correspondence points 703 and 704 and superimposes the correspondence points 703 and 704 of the division images 701 and 702 with each other according to the estimated shift amount and deformation amount to generate a composite image as illustrated in FIG. 13C.

Fourth, the list creation unit 15 aligns and superimposes the plan area 5 of the plan data 4 on the composite image 705.

When the labels 3 are captured in a plurality of division images 701 and 702, there is a case where one character string on the labels 3 is captured in the plurality of division images 701 and 702. In this case, the positioning unit 14 sets a detection likelihood L and a recognition score M of the character area 8 in which the character string is detected, as a mean value of detection likelihoods L and recognition scores M of the division images 701 and 702, and determines the recognition information of the character string by majority of the recognized characters. In addition, the positioning unit 14 may set the highest detection likelihood L and the recognition information having the highest recognition score M as recognition information of the character area 8.

The recognition unit 13 may recognize characters for each division image and may join the recognition information of associated character areas 8 together.

According to this embodiment, it is possible to acquire recognition information from the character area 8 even when the character areas 8 cannot be detected and recognized due to shielding or reflection by other objects. In addition, the recognition unit 14 may recognize characters marked on curved labels 3 by varying the capturing angle of the camera 16.

Third Embodiment

Next, an article managing apparatus 10 of a third embodiment will be described.

This embodiment is a modification of the second embodiment and is to capture plural division images 701 and 702 by varying illumination conditions with the camera 16 fixed. That is, in the third embodiment, the camera 16 fixed at the same position captures the same shelf 1 plural times while varying illumination conditions such as an illumination angle, brightness, and installation position of an illumination apparatus, and the acquisition unit 11 acquires the plural division images 701 and 702.

The positioning unit 14 generates a composite image 705 by combining the plural division images 701 and 702 acquired by the acquisition unit 11. In addition, since only the illumination conditions are changed and the capturing position is fixed, it is unnecessary to align the plural division images 701 and 702.

The detection unit 12 detects the character areas 8 of each of the division images 701 and 702 and employs a division image 701 or 702 having a character area 8 having the highest contrast.

According to the article managing apparatus 10 of this embodiment, even when there is an area overexposed or underexposed by illumination in one check image 7, it is possible to detect a character area 8 having the highest contrast from the plural division images 701 and 702 with the illumination conditions varied.

[First Modification]

A first modification of the article managing apparatus 10 of the above embodiments will be described. In the article managing apparatus 10 of the above embodiments, the plan area 5 of the plan data 4 is transformed to the image coordinate system of the check image 7 and superimposed with the character area 8. Instead, however, the character area 8 of the check image 7 may be transformed to the data coordinate system of the plan data 4 and may be superimposed with the plan area 5.

The coordinate-transformation to the data coordinate system uses the same method as the method of coordinate-transforming the plan area 5 on the plan data 4 onto the check image 7. At this time, the list creation unit 15 outputs the plan data 4 to which an attribute is assigned.

Regarding the coordinate-transformation method, although the capturing position of the check image 7 is not fixed in the first embodiment, without being limited thereto, the capturing position of the check image 7 may be fixed such that a particular position on the plan data 4 corresponds to a particular position on the check image 7.

In addition, a plurality of certain positions on the check image 7 and a plurality of corresponding certain positions on the plan data 4 may be designated manually by an operator, and the plan area 5 may be coordinate-transformed such that the designated positions overlap with each other. In addition, the check image 7 may be captured with a marker set at a particular position of the shelf 1 (e.g., the corner of the shelf 1), and the plan area 5 may be coordinate-transformed so as to align a position of the captured marker with a corresponding marker position on the plan data 4.

In addition, the alignment on the plan data 4 and the check image 7 may be achieved using other methods known in the art.

[Second Modification]

A second modification of the article managing apparatus 10 of the above embodiments will be described. Although the detection unit 12 of the article managing apparatus 10 of the above embodiments detects a character string from the check image 7, and in addition to this, an area on which management information of the articles 2 is described may be detected. Specifically, the detection unit 12 may detect an area on which management information of the articles 2 is described, and may detect a character string indicating the articles 2 with a limitation to the detected area.

An example of the area described with the "management information" may include an article tag or the like. The detection unit 12 may detect the article tag and may detect only a character string of a character area 8 of the article tag or only a character string at a particular position of the article tag.

The article tag may be detected by using a tag detection dictionary that has learned article tag check images 7 and non-article tag check images 7 in advance to collate partial areas cut away from a resolution pyramid check image 7 in the check image 7. When a detection likelihood L representing the likelihood of the article tag is equal to or higher than a detection threshold for article tag detection, the partial areas are detected as article tag areas.

Detecting the article tag areas is not limited to the above method but may employ other methods known in the art, such as a method of detecting a particular feature pattern from the check image 7, a method of using pattern matching or a neural network, or a combination of these methods.

In addition, a detection likelihood L of the article tag may be used as the detection likelihood L of the character area 8. In addition, one of a mean value, a maximum value, and weighting addition of a character string detection likelihood L calculated when a character string is detected, and an article tag detection likelihood L may be used as the detection likelihood L.

[Third Modification]

A third modification of the article managing apparatus 10 of the above embodiments will be described. In the article managing apparatus 10 of the above embodiments, an attribute is assigned in a way of determining one installation condition of the labels 3. However, the attribute may be quantized in continuity to allow importance degrees of work contents to be compared with each other.

In addition, an importance degree representing a probability required by a work may be assigned to the installation conditions of the labels 3.

First, the list creation unit 15 determines an attribute according to the method described in the first embodiment.

Second, the list creation unit 15 obtains a total value G of the detection likelihood L, the recognition score M, and the matching degree K. That is, G-L+M+L. An importance degree is denoted by J, and an upper limit of the importance degree is denoted by JM.

Third, when the attribute determined by the list creation unit 15 is "normal," the importance degree J is set to JM-G.

Fourth, when the attribute determined by the list creation unit 15 is "wrong installation" or "installation position error," the importance degree J is set to 1/(L+M+K).

Fifth, when the attribute determined by the list creation unit 15 is "installation forgot," the importance degree J is set to the highest value in a case where the corresponding character area 8 is not present, and the importance degree J is set to 1/(L+M+K) in a case where the corresponding character area 8 is present.

Thus, an area with a more need to check the labels 3 has a higher importance degree, whereas an area with a less need to check the labels 3 such as a case in which the recognition is wrong, has a lower importance degree.

In addition, for an area having a low importance degree, without an operator to go to the site, a checking operation may be reduced by checking only the check image 7.

In addition, for an area having a high importance degree except normal, since there is a high possibility of need of a correction work, the work may be efficiently performed by performing an actual checking operation without checking the check image 7.

In addition, even for an area assigned with the "normal" attribute but having a high importance degree, since there is a possibility of a recognition error, a correction miss due to the recognition error may be prevented by checking the check image 7.

Thus, in this modification, it is possible to streamline the checking work by assigning an importance degree to an attribute.

[Fourth Modification]

A fourth modification of the article managing apparatus 10 of the above embodiments will be described. In the fourth modification, an importance degree is varied according to the meaning of a character string of the labels 3.

In addition, when obtaining an importance degree, the importance degree may be changed depending on whether or not characters (a character string) at a particular position in a character string representing the articles 2 matches with the label information 6.

A management code to manage the articles 2 may have a configuration in which character strings representing the large classification/small classification are connected (e.g., an ISBN code of a book).

For example, a code is classified into a large classification, a middle classification, and a small classification. The large classification is classified into food 1 and others 2. The middle classification is classified into agricultural products 1, livestock products 2, and fishery products 3. In the small classification, an individual ID is assigned for each article 2. For example, tomatoes have a code "1-1-5," and mackerel pikes have a code "1-3-6." At this time, a case where the character area 8 does not match with a character string (e.g., head characters) representing the large classification has a higher importance degree than a case where the character area 8 does not match with a character string (e.g., tail characters) representing the small classification.

Thus, in this modification, a case where labels 3 of articles 2 different in use from the labels 3 of the installed articles 2 are installed may have a higher importance degree.

In addition, a case where a character string representing the articles 2 is an article name including an attribute of a place of production, such as "Japanese made chocolate" or "Belgium made chocolate" will be described. In the recognition unit 13, an article name or a character (e.g., "made") representing an attribute is stored in advance, and then, the meaning of a recognized character is interpreted. In addition, for the same number of matched words, a case where article names match with each other and attributes (places of production) do not match with each other may have a lower importance degree than a case where the article names do not match with each other and the attributes (places of production) match with each other.

[Fifth Modification]

A fifth modification of the article managing apparatus 10 of the above embodiments will be described. In this modification, an attribute is estimated using a classifier included in the list creation unit 15.

First, the classifier learns a matching degree K, a recognition score M, a detection likelihood L, and an attribute representing actual installation conditions of the labels 3 from samples of the plan area 5 of the plan data 4 and the character area 8 of the check image 7. In addition, more samples than the number of kinds of attributes are prepared.

Next, the list creation unit 15 inputs input data (the plan data 4 and the check image 7) with its attribute to be determined, to the classifier and estimates attributes of the labels 3.

An example of the classifier may include a multiclass SVM or a KNN classifier.

The multiclass SVM learns a classification plane separating attributes of the samples from each other on a feature space and determines the attributes from a distance from the learned classification plane.

The KNN classifier estimates attributes of the input data from the attributes of samples at a close distance of the input data on the feature space.

In addition, for the samples of the plan data 4 and the check image 7, an importance degree for the plan area 5 may be set in advance, a vector connecting a matching degree K, recognition score M, and detection likelihood L corresponding to the set importance degree may be set as a feature x, a regression line for calculating the importance degree may be learned from the feature x, and the learned regression line expressed by the following expression (1) may be used to estimate the importance degree.

When an importance degree set in a sample of the feature x is denoted by yi, the regression line for calculating the importance degree is obtained by minimizing an error function normalized using the following expression (2).

[Eq. 1]

$$f(\vec{x_1}) = \vec{W}^T x + b \tag{1}$$

$$\tfrac{1}{2}\sum_{n=1}^{N}(f(\vec{x_n}) - y_n) + \tfrac{1}{2}\|\vec{W}\|^2 \tag{2}$$

W: coefficient depending on feature $x_1$
b: integer term
W and b are determined from collected samples At this time, the regression is not limited to the above method but may employ other methods known in the art.
[Sixth Modification]

Modifications of the article managing apparatus 10 of the above embodiments, other than the above first to fifth modification, will be described.

In the positioning unit 14 of the first embodiment, a shaded character area 8 may be provided with a margin and may be scaled to be larger or smaller than a detected character area 8. For example, in a case where a character is small with respect to the check image 7, although a character string paralleled vertically to a projective axis is projected, since the same coordinates on the projective axis may not be obtained due to distortion or the like of the character area 8, the positioning unit 14 enlarges the character area 8. In addition, in a case where a character is large with respect to the check image 7, even when the character string is not paralleled vertically to the projective axis, since coordinates may overlap with each other on the projective axis, the positioning unit 14 reduces the character area 8.

In addition, in the positioning unit 14 of the first embodiment, the character area 8 may be projected onto the x axis and may be projected onto the y axis for each set frame line, and a frame line constituting rows every column may be set.

In addition, an axis projected by the positioning unit 14 of the first embodiment may be not the x and y axes on the check image 7 but may be an axis in the long or short side direction of a detected character area 8. In addition, for a plurality of axes in the long side direction, the axis projected by the positioning unit 14 of the first embodiment may be set as a mean value or a most frequent value of the plurality of axes in the long side direction.

In addition, in relation to a method of associating the check image 7 and the plan data 4 with each other, when the check image 7 and the plan data 4 are superimposed with each other, a distance between the character area 8 of the check image 7 and the plan area 5 closest to the character area is within a reference distance, and there exists no other character area 8 in the plan area 5 except for the close character area 8, the positioning unit 14 of the first embodiment may determine that the close character area 8 corresponds to the plan area 5.

Further, although the determination on attributes in the list creation unit 15 of the first embodiment is made according to the method of using the detection likelihood L and the recognition score M in addition to the matching degree K, without being limited thereto, a situation to be classified for a work area by an operator may be set as an attribute or only one of the detection likelihood L and the recognition score M may determine an attribute with the matching degree K.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for managing articles, comprising:
processing circuitry configured to:
acquire a check image by capturing an image of a shelf on which a plurality of articles are arranged and labels which are installed on a front surface of the shelf or front surfaces of the articles and include label information of a character string including one of letters, numbers, and symbols provided to manage the articles;
acquire plan data including a plurality of plan areas indicating installation positions of the labels in the shelf and the label information of the labels assigned to the respective plan areas;
detect a character area of the character string displayed on each of the labels from the check image;
recognize characters in the character areas;
position and superimpose the check image and the plan data, and associate each of the character areas and each of the plan areas;
compare the label information of the associated plan areas and the recognition information of the associated character areas, and assign attributes to the character areas or the plan areas, each of the attributes indicating a state related to correctness or incorrectness of installation of the articles which can be obtained from matching or mismatching between the label information and the recognition information;
obtain a distance between the character area and the plan area;
obtain a matching ratio from a matching degree between the recognition information of the character area and the label information of the plan area;
obtain a detection likelihood indicating the accuracy of characters in the character area;
obtain a recognition score indicating the correctness of the character recognition;
obtain an importance degree of a correction work of installation of the articles based on the distance, the matching ratio, the detection likelihood, and the recognition score; and
assign the importance as an attribute to the character area or the plan area.

2. The apparatus according to claim 1, wherein the processing circuitry is further configured to:
create a work list for each of the character areas or each of the plan areas, the work list including positions of the plan areas, the label information, positions of the character areas, the recognition information and the attributes.

3. The apparatus according to claim 1, wherein the processing circuitry is further configured to:
assign the attributes to the character areas of the check image and output the check image, or assign the attributes to the plan areas of the plan data and output the plan data.

4. The apparatus according to claim 1, wherein each of the plan areas of the plan data is rectangular, and the plan areas are vertically or horizontally arranged side by side, and wherein the processing circuitry is further configured to:
create a plurality of rectangular cells by partitioning the character areas of the check image and associate the plan areas and the character areas by allocating the character areas to the cells and superimposing the plan areas and the cells.

5. The apparatus according to claim 4, wherein the processing circuitry is further configured to:
superimpose the plan areas and the cells such that a vertical frame line and a horizontal frame line partitioning the plan areas are aligned with a vertical frame line and a horizontal frame line partitioning the cells, respectively.

6. The apparatus according to claim 1, wherein the processing circuitry is further configured to:
obtain a matching ratio from a distance between the character area and the plan area and a matching degree between the recognition information of the character area and the label information of the plan area, assign an attribute of "normal" when the matching ratio is equal to or higher than a predetermined matching threshold, and assign an attribute of "wrong installation" when the matching ratio is lower than the matching threshold.

7. The apparatus according to claim 1, wherein the processing circuitry is further configured to:
when the position of the character area does not match with the position of the plan area, determine that the labels are installed at positions at which the plan areas are not present, and assign an attribute of "installation position error".

8. The apparatus according to claim 1, wherein the processing circuitry is further configured to:
when the character area in the check image cannot be detected by a detection unit, determine that the labels are not installed, and assign an attribute of "installation forgot".

9. The apparatus according to claim 1, wherein the processing circuitry is further configured to:
when a detection likelihood indicating the accuracy of characters in the character area detected by a detection unit is lower than a predetermined detection threshold and a recognition score indicating the correctness of character recognition by a recognition unit is equal to or higher than a predetermined recognition threshold, determine that the labels are installed to be hard to be visible, and assign an attribute of "installation deficiency".

10. A method for managing articles, comprising:
acquiring a check image by capturing an image of a shelf on which a plurality of articles are arranged, and labels which are installed on a front surface of the shelf or front surfaces of the articles and include label information of a character string including one of letters, numbers, and symbols provided to manage the articles;
acquiring plan data including a plurality of plan areas indicating installation positions of the labels in the shelf and the label information of the labels assigned to the plan areas, respectively;
detecting a character area of the character string displayed on each of the labels from the check image;
recognizing characters in the character areas;
positioning and superimposing the check image and the plan data and associating each of the character areas and each of the plan areas;
comparing the label information of the associated plan areas and the recognition information of the associated character areas and assigning attributes to the character areas or the plan areas, wherein each of the attributes indicates a state related to correctness or incorrectness of installation of the articles which can be obtained from matching or mismatching between the label information and the recognition information;
obtaining a distance between the character area and the plan area;
obtaining a matching ratio from a matching degree between the recognition information of the character area and the label information of the plan area;
obtaining a detection likelihood indicating the accuracy of characters in the character area;
obtaining a recognition score indicating the correctness of the character recognition;
obtaining an importance degree of a correction work of installation of the articles based on the distance, the matching ratio, the detection likelihood, and the recognition score; and
assigning the importance as an attribute to the character area or the plan area.

11. A program stored in a non-transitory computer readable medium, causing a computer to perform a method for managing articles, the method comprising:
acquiring a check image by capturing an image of a shelf on which a plurality of articles are arranged, and labels which are installed on a front surface of the shelf or front surfaces of the articles and include label information of a character string including one of letters, numbers and symbols provided to manage the articles;
acquiring plan data including a plurality of plan areas indicating installation positions of the labels in the shelf and the label information of the labels assigned to the plan areas, respectively;
detecting a character area of the character string displayed on each of the labels from the check image;
recognizing characters in the character areas;
positioning and superimposing the check image and the plan data and associating each of the character areas and each of the plan areas;
comparing the label information of the associated plan areas and the recognition information of the associated character areas and assigning attributes to the character areas or the plan areas, wherein each of the attributes indicates a state related to correctness or incorrectness of installation of the articles which can be obtained from matching or mismatching between the label information and the recognition information;
obtaining a distance between the character area and the plan area;
obtaining a matching ratio from a matching degree between the recognition information of the character area and the label information of the plan area;
obtaining a detection likelihood indicating the accuracy of characters in the character area;
obtaining a recognition score indicating the correctness of the character recognition;
obtaining an importance degree of a correction work of installation of the articles based on the distance, the matching ratio, the detection likelihood, and the recognition score; and
assigning the importance as an attribute to the character area or the plan area.

* * * * *